(12) United States Patent
Unger

(10) Patent No.: US 8,644,208 B2
(45) Date of Patent: Feb. 4, 2014

(54) MULTI-ANTENNA RELAY STATION WITH TWO-WAY CHANNEL

(75) Inventor: Timo Marcus Unger, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 602 days.

(21) Appl. No.: 12/448,472

(22) PCT Filed: Dec. 3, 2007

(86) PCT No.: PCT/EP2007/063185
§ 371 (c)(1), (2), (4) Date: Oct. 7, 2009

(87) PCT Pub. No.: WO2008/077719
PCT Pub. Date: Jul. 3, 2008

(65) Prior Publication Data
US 2010/0039980 A1 Feb. 18, 2010

(30) Foreign Application Priority Data
Dec. 22, 2006 (EP) ..................................... 06026753

(51) Int. Cl.
*H04B 7/14* (2006.01)
(52) U.S. Cl.
USPC ........... 370/315; 370/328; 370/329; 370/338; 370/339; 370/334
(58) Field of Classification Search
USPC .................. 370/315, 328, 329, 338, 339, 334
See application file for complete search history.

(56) References Cited

U.S. PATENT DOCUMENTS

| 7,720,020 | B2 * | 5/2010 | Larsson | 370/315 |
|---|---|---|---|---|
| 7,826,337 | B2 * | 11/2010 | Shi et al. | 370/201 |
| 2005/0190821 | A1 | 9/2005 | Fujii et al. | |
| 2007/0086512 | A1 * | 4/2007 | Can et al. | 375/148 |
| 2011/0317575 | A1 * | 12/2011 | Bourdoux et al. | 370/252 |

FOREIGN PATENT DOCUMENTS

| CN | 1658533 A | 8/2005 |
|---|---|---|
| WO | 2005/064872 A1 | 7/2005 |
| WO | 2006/071187 A2 | 7/2006 |

OTHER PUBLICATIONS

R/ Pabst et al; "Relay-Based Deployment Concepts for Wireless and Mobile Broadband Radio"; IEEE Communications Magazine; Sep. 2004; pp. 80-89.
J. Nicholas Laneman et al; "Cooperative Diversity in Wireless Networks: Efficient Protocols and Outage Behavior"; IEEE Transactions on Information Theory, vol. 50, No. 12; Dec. 2004; pp. 3062-3080.
Hui Shi et al; "A 'Relay Node Division Duplex' Relaying Approach for MIMO Relay Networks"; 17th Annual IEEE International Symposium on Personal, Indoor and Mobile Communications; Sep. 2006; pp. 1-5.

(Continued)

*Primary Examiner* — Christopher Grey
(74) *Attorney, Agent, or Firm* — Staas & Halsey LLP

(57) ABSTRACT

In relaying signals in a multi-hop network, two-way transmission signals are received at the relay device via at least two antenna elements. The received two-way transmission signals are separated and subjected to a transmit processing at the relay device. Thereby, transmit and receive processing can be restricted to the relay device and signalling load between the transmitting end and the receiving end can be reduced.

13 Claims, 2 Drawing Sheets

(56) References Cited

OTHER PUBLICATIONS

R. Ahlswede et al.; "Network Information Flow"; IEEE Transactions on Information Theory; vol. 46, No. 4; Jul. 2000; pp. 1204-1216.

M. Meurer et al; "Receiver Orientation versus Transmitter Orientation in Linear MIMO Transmission Systems"; EURASIP Journal on Applied Signal Processing, vol. 2004, No. 9, pp. 1191-1198.

Michael Joham; Optimization of Linear and Nonlinear Transmit Signal Processing; Ph.D. thesis, Lehrstuhl für Netzwerktheorie and Signalverarbeitung, Technische Universität München, Apr. 2004; pp. 1-159.

IEEE Standard for Conformance to IEEE 802.16, Part 4: Protocol Implementation Conformance Statement (PICS) Proforma for Frequencies below 11 GHz, IEEE Std 802.16™/Conformance Apr. 2006; 2007; pp. i-ix, 1-82.

IEEE Standard for Local and metropolitan area networks; Part 16: Air Interface for Fixed Broadband Wireless Access Systems; IEEE Std 802.16™-2004; 2004; pp. i-xxxiv, 1-857.

IEEE Standard for Information technology—Telecommunications and information exchange between systems—Local and metropolitan area networks—Specific requirements, Part 11: Wireless LAN Medium Access Control (MAC) and Physical Layer (PHY) Specifications; IEEE Std 802.11™-2007; pp. i-xlvi, 1-1184.

IEEE Standard for Local and metropolitan area networks, Part 20: Air Interface for Mobile Broadband Wireless Access Systems Supporting Vehicular Mobility—Physical and Media Access Control Layer Specification; IEEE Std 802.20-2008; 2008; pp. i-xi, 1-1039.

B. Rankov et al.; "Spectral Efficient Signaling for Half-Duplex Relay Channels" Conference Record of the Thirty-Ninth Asilomar Conference on Signals, Systems and Computers, Oct. 2005; pp. 1066-1071.

O. Munoz et al.; "Non-Regenerative MIMO Relaying with Channel State Information"; Proceedings of the IEEE International Conference on Acoustics, Speech and Signal Processing, Mar. 2005; pp. 361-364.

B. Rankov et al.; "Achievable Rate Regions for the Two-Way Relay Channel"; 2006 IEEE International Symposium on Information Theory, Jul. 2006; pp. 1668-1672.

International Search Report for Application No. PCT/EP2007/063185; mailed Mar. 13, 2008.

\* cited by examiner

PRIOR ART
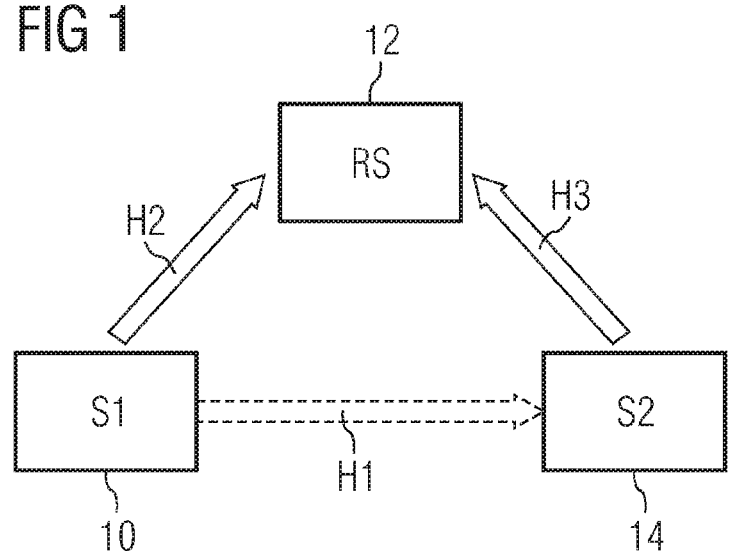
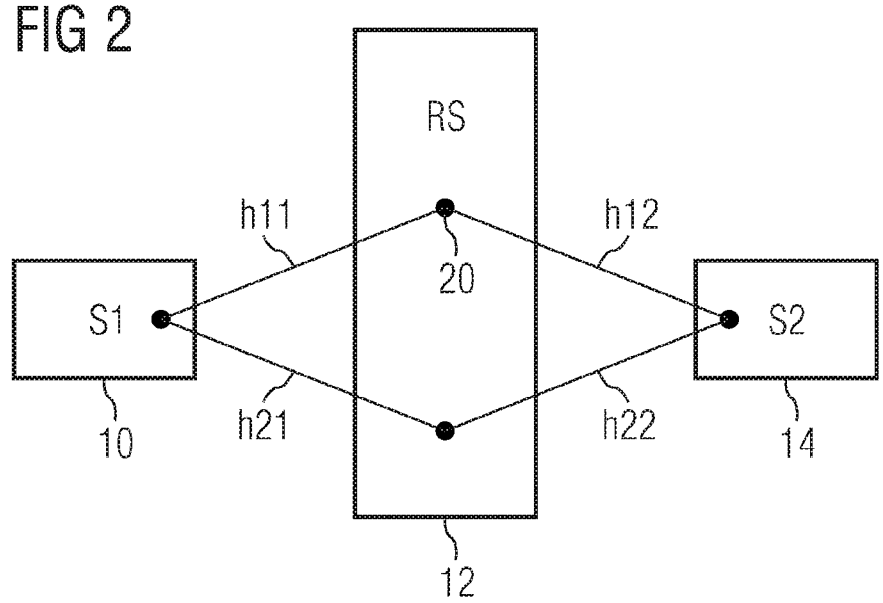

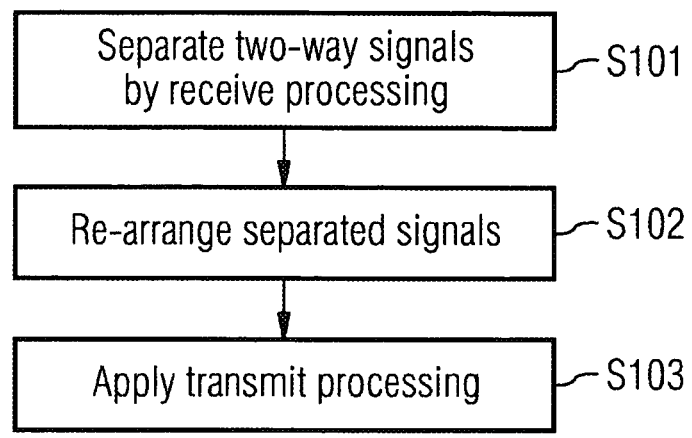
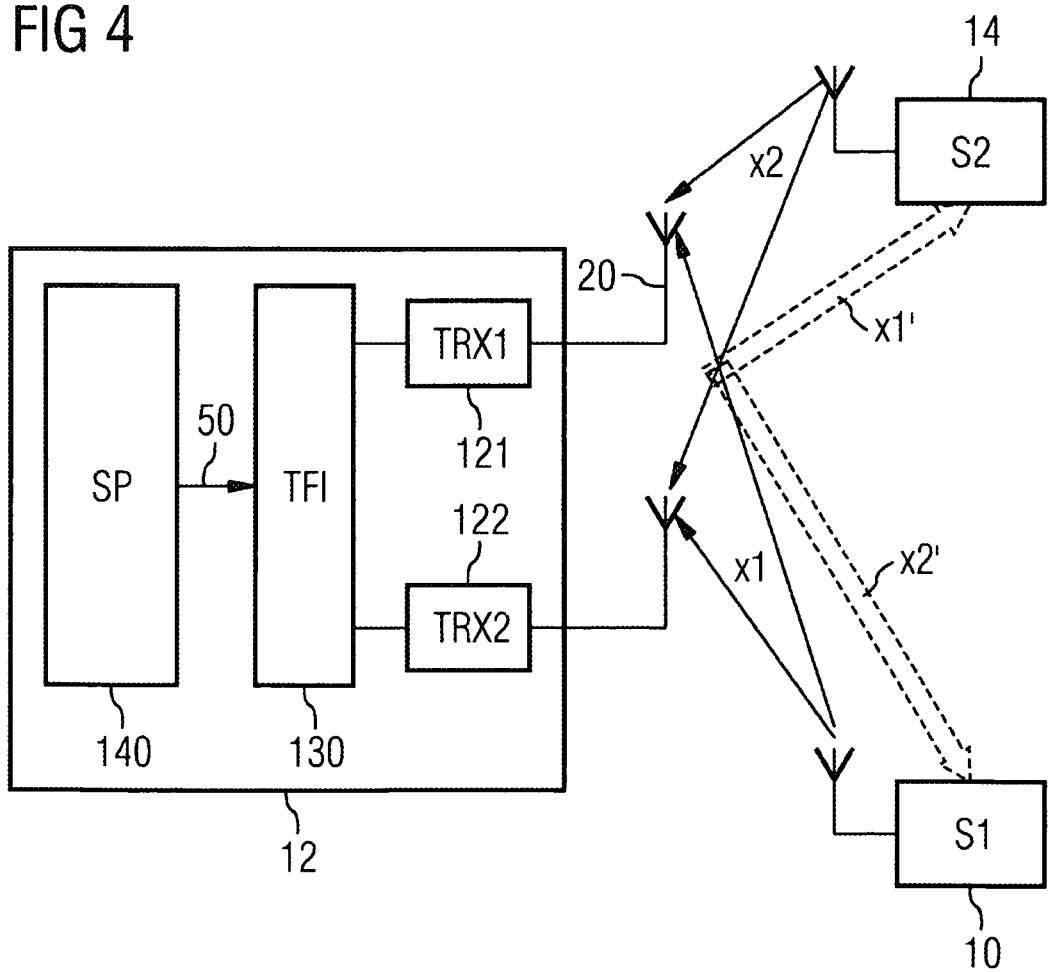

MULTI-ANTENNA RELAY STATION WITH TWO-WAY CHANNEL

CROSS REFERENCE TO RELATED APPLICATIONS

This application is the U.S. national stage of International Application No. PCT/EP2007/063185, filed Dec. 3, 2007 and claims the benefit thereof. The International Application claims the benefit of European Application No. 06026753 filed on Dec. 22, 2006, both applications are incorporated by reference herein in their entirety.

BACKGROUND

Described below are a method, system, network device and computer program product for relaying a signal via a multi-antenna relay station.

Wireless networking constitutes an important component of future information technology applications. Recently, the use of multiple antennas at wireless transmitters and receivers has been proposed as an enabling technique for high-rate multimedia transmissions over wireless channels.

For transmissions from a transmitting node (e.g., terminal device, base station, access point, etc.) to a receiving node (e.g., terminal device, base station, access point, etc.) of a wireless multi-hop network (e.g., cellular network, wireless ad-hoc network, wireless local area network (WLAN), wireless broadcast and/or broadband network, etc.) relay stations can be exploited to relay messages for end users. Motivation for using relay stations can be that, in a cellular network, direct transmissions between the base station and users close to the cell boundary can be very expensive in terms of the transmission power required to ensure reliable communications, or that existing radio frequency (RF) technologies typically can accommodate only one or two antennas at the user end, indicating that current wireless systems cannot fully benefit from promising space-time techniques. By making use of relay stations (which can accommodate multiple antennas) to relay the message, the channel is effectively converted into a relay channel. Another example is to utilize relay nodes for cooperative communications in ad hoc networks, where the nodes close to the active transmitter and the receiver can relay data packets from the transmitter to the receiver.

FIG. 1 shows a schematic block diagram of a two-hop relaying case as described for example in R. Pabst, B. H Walke, D. C. Schultz, P. Herhold, S. Mukherjee, H. Viswanathan, M. Lott, W. Zirwas, M. Dohler, H. Aghvami, D. D. Falconer, and G. P. Fettweis, "Relay-Based Deployment Concepts for Wireless and Mobile Broadband Radio," IEEE Communications Magazine, pp. 80-89, September 2004. According to FIG. 1, two nodes S1 10 and S2 20 can communicate with each other via an intermediate relay station (RS) 12 assuming that a direct communication between the two nodes 10, 14 on a single hop H1 is not possible, e.g., due to shadowing or limited transmit power. In general, the RS 12 receives a signal from the first node S1 10 on a first hop H2 and retransmits a signal addressed to the second node S2 14 on a second hop H3.

There are two prominent concepts for this two-hop relaying case: amplify-and-forward (AF) and decode-and-forward (DF), as described for example in J. N. Laneman, D. N. C. Tse, and G. W. Wornell, "Cooperative Diversity in Wireless Networks: Efficient Protocols and Outage Behavior," IEEE Transactions on Information Theory, vol. 50, no. 12, pp. 3062-3080, December 2004. In AF, the received signal at the RS 12 is only amplified and retransmitted by the RS 12, whereas in DF, the received signal is decoded, re-encoded, and retransmitted by the RS 12.

Assuming that the RS 12 can only receive and transmit on orthogonal channel resources, the required resources in AF relaying for instance are doubled compared to a direct communication between two nodes, i.e., although two-hop relaying aims at an increase in spectral efficiency there exists a trade-off in that a conceptual degradation of the spectral efficiency by the factor ½ is inherent.

Several proposals have been made to compensate this conceptual drawback of two-hop relaying. Common to all these protocols is that it is not possible to improve the spectral efficiency of a single two-hop connection between source and destination, but the overall spectral efficiency of different two-hop connections. In H. Shi, T. Asai, and H. Yoshino, "A Relay Node Division Duplex Relaying Approach for MIMO Relay Networks," in Proc. of IEEE 17th Symposium on Personal, Indoor and Mobile Radio Communications, Helsinki, Finland, September 2006, several two-hop connections with multiple RSs are considered. These RSs are divided into two groups. While the first group of RSs receives signals, the second group of RSs transmits signals on the same channel resource and vice versa. This protocol significantly increases spectral efficiency of the network.

Two other protocols are introduced in B. Rankov and A. Wittneben, "Spectral Efficient Signaling for Half-duplex Relay Channels," in Proc. Asilomar Conference on Signals, Systems and Computers, Pacific Grove, November 2005 and B. Rankov and A. Wittneben, "Achievable Rate Regions for the Two-way Relay Channel," in Proc. IEEE Int. Symposium on Information Theory (ISIT), Seattle, USA, July 2006. The first protocol is called "two-path relaying" and the second protocol is called "two-way relaying". The principle of the cooperative protocol "two-way relaying" is based on the framework of network coding proposed in R. Ahlswede, N. Cai, S. R. Li, and Yeung R. W., "Network Information Flow," IEEE Transactions on Information Theory, vol. 46, no. 4, pp. 1204-1216, July 2000, where data packets from different sources in a multi-node computer network are jointly encoded at intermediate network nodes, thus saving network resources. For two-way relaying, two nodes transmit simultaneously on a first channel resource to a RS which receives a superposition of both signals. On the second channel resource, the RS retransmits this superposition. Due to the broadcast nature of the wireless channel, both nodes receive that superposition and may detect the desired signal from the other node by subtracting their own known signal. It can be shown that the spectral efficiency of two-hop relaying is significantly increased by the two-way relaying protocol.

However, in order to design an adequate receive filter both nodes of the two-way relay network require channel state information (CSI) about their own link to the RS as well as CSI about the link from the other node to the RS. Exchanging this CSI requires a high signalling effort.

SUMMARY

An aspect is to provide an enhanced two-way relaying concept, by which signalling load can be reduced.

The above method may be achieved by a computer program product with program code for producing the above methods when run on a computer device.

Accordingly, the proposed concept of multiple-antenna two-way relaying can be easily integrated into a known two-hop relay network without any changes at transmitting and receiving nodes (e.g., base stations and mobile terminals). Only multiple antennas have to be installed at the relay station device and no additional site is required. The typical degradation of the spectral efficiency by factor ½ for two-hop relaying is avoided since up- and downlink can be processed simultaneously. Transmit and receive processing can be restricted to the relay station device and signalling of channel state information or other channel-related information between the transmitting end and the receiving end is no longer required.

The separated two-way transmission signals may be rearranged before retransmission via the at least two antenna elements. In an optional example, the rearranging may be performed by using a relay mapping matrix. Furthermore, the two-way transmission signals may be separated and processed at the relay device based on a channel information. This channel information may for example be derived from a channel estimation performed at the relay device.

The number of the at least two antenna elements used at the relay device may be selected to be at least twice the number of antenna elements used at network elements which communicate via the relay device.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 1 shows a schematic block diagram of a two-hop relaying case in a wireless network;

FIG. 2 shows a schematic block diagram of two-way relay network according to the embodiment;

FIG. 3 shows a schematic flow diagram of a relay signal processing according to the embodiment; and FIG. 4 shows a schematic block diagram of a relay device according to the embodiment.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The embodiment will now be described in greater detail based on a multi-antenna RS device which may be any type of device, component, circuit, module etc., and which may be adapted to communicate with any kind of network node, such as a wireless access device, a cellular base station device, a cellular telephone, a handheld computer, a multimedia device, an integrated chip, etc. The apparatus according to the embodiment can be employed in any wireless communication network which allows receipt of transmission signals over a wireless medium.

More specifically, the multi-antenna RS device according to the embodiment may be a MIMO-based device having at least two antennas which can be used for reception (Rx) and at least two antennas which can be used for transmission (Tx). In so-called MIMO (Multiple Input Multiple Output) systems antenna arrays are used to enhance bandwidth efficiency. MIMO systems provide multiple inputs and multiple outputs for a single channel and are thus able to exploit spatial diversity and spatial multiplexing. Further information about MIMO systems can be gathered from the IEEE specifications 802.11n, 802.16-2004 and 802.16e, as well as 802.20 and 802.22 which relate to other standards. Specifically, MIMO systems have been introduced to radio systems like e.g. WiMAX (Worldwide Interoperability for Microwave Access) and are currently standardized in 3GPP for WCDMA (Wideband Code Division Multiple Access) as well as 3GPP E-UTRAN (Enhanced Universal Mobile Telecommunications System (UMTS) Terrestrial Radio Access Network), such as LTE (Long Term Evolution) or 3.9G.

Based on partial or full channel state information (CSI) fed back from a transmitting node, the RS device may perform appropriate space-time processing such as multiuser scheduling, power and modulation adaptation, beamforming, and space-time coding. The CSI may include a channel direction information (CDI) and a channel quality information (CQI), which can be used for determining beamforming direction and power allocation.

In the present embodiment, the two-way relaying approach is extended to nodes and RS devices with multiple antennas leading to a multiple input multiple output (MIMO) two-way relaying protocol or concept.

In the following, a description of a MIMO two-way relaying concept according to the embodiment is given based on FIG. 2 for a communication between two nodes S1 10 and S2 14 which cannot exchange information directly, e.g., due to shadowing conditions, but via an intermediate RS device 12. The nodes S1 10 and S2 14 are equipped with antenna arrangements of $M_1$ and $M_2$ antennas, respectively.

For the proposed MIMO two-way relaying protocol according to the embodiment, the antenna arrangements of the two nodes S1 10 and S2 14 can be configured according to the following equation:

$$M_1 = M_2 = M$$

and it is assumed that the RS device 12 has an antenna arrangement with a total number of:

$$M_{RS} \geq M_1 + M_2 = 2M$$

antennas, i.e., the number of antennas at the RS device 12 is at least twice as much as the number of antennas at the nodes S1 10 and S2 14, respectively.

In the example of FIG. 2, the dark circular patterns 20 each represent a single antenna. Hence, the described network is depicted for an exemplary case where M=1 and $M_{RS}$=2. The coefficients $h_{ij}$, i=1, 2 and j=1, 2, describe the channel coefficients between the different antenna elements.

A first signal $x_1$ shall be transmitted from the first node S1 10 to the second node S2 14, and a second signal $x_2$ shall be transmitted from the second node S2 14 to the first node S1 10. On the first hop the two nodes S1 10 and S2 14 transmit simultaneously to the RS device 12. Since the RS device 12 in the two-way relay channel has a transmitter as well as a receiver, a transceive filter can be applied at the RS device 12 if channel information (e.g., CSI) is available.

FIG. 3 shows a schematic flow diagram of a signal processing at the RS device 12 according to the embodiment.

At S101, the RS device 12 separates the signals x1 and x2 received from the nodes S1 10 and S2 12 by a receive processing. Then, at S102, the RS device 12 rearranges the separated signals x1 and x2 in order to provide the first node S1 10 with the desired signal x2 and the second node S2 14 with the desired signal x1. This can be done by a simple RS mapping matrix. Finally, at S103, the RS device 12 also applies transmit processing before retransmitting to the nodes S1 10 and S2 14. Thus, receive processing and in particular subtracting the own signal become unnecessary at the nodes S1 10 and S2 14.

As initially mentioned, a major drawback of the known two-way relaying protocol proposed in B. Rankov and A. Wittneben, "Spectral Efficient Signaling for Half-duplex Relay Channels," in Proc. Asilomar Conference on Signals, Systems and Computers, Pacific Grove, November 2005 is that both nodes S1 10 and S2 14 require CSI information about their own link to the RS device 12 as well as CSI information about the link from the respective other node to the RS device 12. Exchanging this CSI information requires a high signalling effort. Compared to this signalling effort, it is relatively easy to obtain the CSI information at the RS device 12, e.g., by estimating the channel at the RS device 12 in a time division duplex (TDD) system. If the CSI information is available at the RS device 12, this CSI information can be used for receive and transmit processing at the RS device 12 in a corresponding transceive filter introduced to the RS device 12 according to the embodiment.

FIG. 4 shows a schematic block diagram of the RS device 12 according to the embodiment. The RS device includes two transmit and receive antennas 20 which are connected to respective first and second transceiver (TRX) units 121 and 122. Of course, both antennas could as well be connected to a single TRX unit capable of processing two transmission and reception streams. Furthermore, the two TRX units are connected to a transceive filter 130 arranged for applying predetermined transmit and receive processing based on control information 50 supplied by a signal processing stage 140. The transceive filters 130, which could as well be provided as two separate transceiver filters for the two TRX branches, is further connected to the signal processing stage 140 which is responsible for receiver-related relay processing, such as at least one of demodulating, descrambling, decoding etc. for signals received via the transceiver filter 130, and for transmitter-related relay processing, such as at least one of modulating, scrambling, coding, beamforming, user selection etc. for signals to be transmitted via the transceiver filter 130. This relay processing is of course dependent on the implemented relay concept, which may be AF or DF or any other suitable concept. The signal processing stage 140 may be configured to perform processing as described with reference to FIG. 3, wherein the control information 50 may be derived from the channel information (e.g. CSI) which could be estimated at the RS device 12. When applying the channel information, the scalar amplification factor at the RS device 12 can be adapted to the current channel state which significantly improves the performance compared to a constant amplification factor at the RS device 12 for unknown CSI.

Through the transceive filter 130 at the RS device 12, the signal processing effort is completely moved from the first and second nodes S1 and S2 to the RS device 12 and no further CSI is required at the first and second nodes S1 and S2 which significantly reduces the signalling overhead for CSI in the network.

In a linear system, the transceive filter 130 may be configured as a multiplication of a receive filter, a RS mapping matrix, and a transmit filter, where both filters can be determined independently. The filters can be developed according to any known optimisation criteria for transmit and receive processing, e.g., according to the zero forcing (ZF) and minimum mean square (MMSE) criteria, respectively, as described for example in M. Meurer, P. W. Baier, and W. Qiu, "Receiver Orientation versus Transmitter Orientation in Linear MIMO Transmission Systems," EURASIP Journal on Applied Signal Processing, vol. 9, pp. 1191-1198, August 2004, or M. Joham, "Optimization of Linear and Nonlinear Transmit Signal Processing," Ph.D. thesis, Lehrstuhl für Netzwerktheorie und Signalverarbeitung, Technische Universitat München, April 2004. The MMSE filter provides a better bit error rate (BER) performance than the ZF filter for low to moderate signal-to-noise ratio (SNR). For high SNR, the BER of the ZF filter converges to the BER of the MMSE filter.

For the ZF criterion, the ZF receive filter part of the transceiver filter 130 may be designed so that the mean squared error of an estimate vector for the data vector is minimized. Similarly, the ZF transmit filter part of the transceive filter 130 may also be designed so that the mean squared error of the estimate vector for the transmit vector is minimized. Additionally, the ZF constraint (i.e., estimated value equals transmission value without noise at the receiver) and the transmit power constraint should be met. Since the derived receive and transmit filters require the same channel coefficients there also exists a high potential for saving processing effort at the RS device 12.

Similarly, for the MMSE criterion, the MMSE receive filter part of the transceive filter 130 may be designed so that the mean squared error of the estimate vector for the data vector is minimized. Additionally, the transmit power constraint at the first and second nodes S1 10 and S2 14 should be met. The MMSE transmit filter part of the transceive filter 130 may be designed so that the mean squared error of the estimate vector for the transmit vector is minimized. Similar to the ZF filter, there exists a high potential for saving processing effort at the RS device 12 since transmit and receiver filters require the same channel coefficients.

If no transmit or receive beamforming is applied, no antenna array gain needs to be exploited. However, for ZF and MMSE transceive filter types the antenna array gain can be exploited at the RS device 12 which leads to a significant increase of BER. For the case of different channel qualities on the two links, the BER may be even increased if different powers are assigned to the two different data streams at the RS device 12. This may be modeled by the relative power distribution factor $\beta$ with $0 \leq \beta \leq 1$, where $\beta=1$ corresponds to assigning all power to the data stream dedicated to the second node S2 14, and $\beta=0$ corresponds to assigning all power to the data stream dedicated to the first node S1 10. Thus, for $\beta=0.5$, both data streams get assigned equal power at the RS which leads to the maximum BER if both links have the same average channel quality, i.e., SNR1=SNR2. If the channels have different SNR, the BER may be increased by introducing even more power to the data stream which has already a higher reliability after the first hop.

In the example of FIG. 4, the first node S1 10 transmits a first signal x1 towards the RS device 12. Simultaneously, the second node S2 14 transmits a second signal x2 towards the RS device 12. The RS device 12 receives both signals x1 and x2 via its TRX units 121 and 122 and separates the signals x1 and x2 by a receive processing applied at the transceiver filter 130. Then, the separated signals x1 and x2 are rearranged e.g. by a mapping matrix provided at the transceiver filter 130 in order to provide the first node S1 10 with the desired signal x2' and the second node S2 14 with the desired signal x1'. Finally, the transceiver filter 130 also applies transmit processing before retransmitting the desired signals x1' and x2' to the nodes S1 10 and S2 14 via the TRX units 121 and 122.

More specifically, at the RS device 12, the received signal is processed at the linear receive filter part of the transceive filter 130 to obtain an estimation signal with an estimate for the signal x1 and an estimate for the signal x2. After the next time slot, the first node S1 10 should receive an estimate of signal x2 and the second node S2 14 should receive an estimate of the signal x1. Therefore, before supplying the signal to the transmit filter part of the transceive filter 130, the estimation signal is processed in a mapping matrix:

$$Gmap = \begin{bmatrix} 0_{M \times M} & I_M \\ I_M & 0_{M \times M} \end{bmatrix}$$

where $0_{M \times M}$ is a null matrix with M rows and M columns, and $I_M$ is an identity matrix. It is noted that the mapping matrix Gmap ensures that the RS device 12 transmits the estimate or desired signals x2' in the direction of the first node S1 10 and the estimate or desired signals x1' in the direction of the second node S2 14. Finally, the processed signal is supplied to the transmit filter part of the transceive filter 130 yielding the desired signals x1' and x2' of the next time slot with the overall transceive filter.

If spatial filtering is only be applied at the RS device 12, only a scalar receive filter part can be provided at the first and second nodes S1 10 and S2 14.

These functionalities of the transceiver filter 130 can be implemented with a processing unit, which may be any processor or computer device with a control unit which performs control based on software routines of a control program stored in a memory. Program code instructions are fetched from the memory and are loaded to the control unit of the processing unit (which may be for example provided in the signal processing stage 140) in order to perform the processing of the above functionalities described in connection with FIG. 4 and the flow diagram of FIG. 3. This processing may be performed on the basis of input data and may generate output data, wherein the input data may correspond to the received two-way signals x1 and x2, and the output data may correspond to the desired signals x1' and x2'.

The proposed concept of MIMO two-way relaying can be easily integrated into a known two-hop relay network where the first and second nodes S1 10 and S2 14 could be a base station (BS) and a mobile terminal (MT), respectively. Only multiple antennas have to be installed at the RS device 12 and no additional site is required. The typical degradation of the spectral efficiency by factor ½ for two-hop relaying can thus be avoided since up- and downlink can be processed simultaneously. Transmit and receive processing can be restricted to the RS device 12 and signalling of CSI or other channel-related information between the BSs and the MTs is not required. For BSs with M antennas, MIMO two-way relaying can also be extended to a simultaneous communication with M MTs if the RS device 12 is equipped with 2M antennas. Furthermore, MIMO two-way relaying for nodes and RS devices with multiple antennas is transparent to the applied relaying concept, i.e., it can be applied for AF relaying as well as for DF relaying.

To summarize, a method, system, relay device and computer program product for relaying signals in a multi-hop network have been described, wherein two-way transmission signals are received at the relay device 12 via at least two antenna elements 20, and wherein the received two-way transmission signals are separated and subjected to a transmit processing at the relay device 12. Thereby, transmit and receive processing can be restricted to the relay device and signalling load between the transmitting end and the receiving end can be reduced.

It is to be noted that the method is not restricted to the embodiment described above. The proposed two-way relaying concept can be applied to any wireless network structure, such as cellular networks, ad-hoc networks, WLAN or broadband and/or broadcast networks. The relay station or device may have more than two antennas or antenna elements.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of relaying signals in a multi-hop network, comprising:
   receiving two-way transmission signals at a relay device via at least two antenna elements;
   adapting a scalar amplification factor to a current channel state when channel information is applied at the relay device;
   separating the two-way transmission signals at the relay device based on the channel information; and
   subjecting the two-way transmission signals to transmit processing at the relay device based on the channel information, including receive filtering, using channel coefficients, that minimizes a first mean squared error of a first estimate vector for a data vector and transmit filtering, using the channel coefficients used by the receive filtering, that minimizes a second mean squared error of a second estimate vector of a transmit vector.

2. The method according to claim 1, further comprising:
   rearranging the two-way transmission signals after said separating; and
   retransmission the two-way transmission signals via the at least two antenna elements after said rearranging.

3. The method according to claim 2, wherein said rearranging is performed by using a relay mapping matrix.

4. The method according to claim 3, wherein the channel information is derived from a channel estimation performed at the relay device.

5. The method according to claim 4, wherein the at least two antenna elements used at the relay device are twice as many as a number of antenna elements used at network elements which communicate via the relay device.

6. A relay device for relaying signals in a multi-hop network, comprising:
   at least two antenna elements receiving two-way transmission signals from the multi-hop network;
   a signal processing stage adapting a scalar amplification factor to a current channel state when channel information is applied; and
   at least one transceive filter unit, separating the two-way transmission signals based on the channel information and then subjecting the two-way transmission signals to transmit processing based on the channel information, having a receive filter part using channel coefficients and designed so that a first mean squared error of a first estimate vector for a data vector is minimized and a transmit filter part using the channel coefficients used by the receive filter part and designed so that a second mean squared error of a second estimate vector of a transmit vector is minimized.

7. The relay device according to claim 6, wherein said at least one transceive filter unit further rearranges the two-way transmission signals after separating and before retransmission via the at least two antenna elements.

8. The relay device according to claim 7, wherein said at least one transceive filter unit rearranges the two-way transmission signals by using a relay mapping matrix.

9. The relay device according to claim 8, wherein said at least one transceive filter unit separates and processes the two-way transmission signals based on channel information.

10. The relay device according to claim 9, wherein the relay device further comprises means for deriving the channel information by performing channel estimation.

11. A communication system of a multi-hop network, comprising
at least one relay device, including
at least two antenna elements receiving two-way transmission signals from the multi-hop network;
a signal processing stage adapting a scalar amplification factor to a current channel state when channel information is applied; and
at least one transceive filter unit, separating the two-way transmission signals based on the channel information and then subjecting the two-way transmission signals to transmit processing based on the channel information, having a receive filter part using channel coefficients designed so that a first mean squared error of a first estimate vector for a data vector is minimized and a transmit filter part using the channel coefficients used by the receive filter part and designed so that a second mean squared error of a second estimate vector of a transmit vector is minimized; and
a plurality of network elements for communicating via said at least one relay device.

12. The communication system according to claim 11, wherein said network elements have antenna elements half as many in number as the at least two antenna elements of said relay device.

13. A non-transitory computer readable medium embodying a computer program that when executed by at least one processor performs a method of relaying signals in a multi-hop network, the method comprising:
receiving two-way transmission signals at a relay device via at least two antenna elements;
adapting a scalar amplification factor to a current channel state when channel information is applied at the relay device;
separating the two-way transmission signals at the relay device based on the channel information; and
subjecting the two-way transmission signals to transmit processing at the relay device based on the channel information, including receive filtering, using channel coefficients, that minimizes a first mean squared error of a first estimate vector for a data vector and transmit filtering, using the channel coefficients used by the receive filtering, that minimizes a second mean squared error of a second estimate vector of a transmit vector.

* * * * *